United States Patent Office 2,746,885
Patented May 22, 1956

2,746,885

METHOD OF PRODUCING A THERMOPLASTIC ADHESIVE AND PRODUCT THEREOF

Frederick W. Holt, Jr., Troy, Ohio, assignor to The Brown-Bridge Mills, Inc., Troy, Ohio, a corporation of Ohio No Drawing. Application July 7, 1953, Serial No. 366,630

5 Claims. (Cl. 117—122)

This invention relates to thermoplastic coating compositions, and more particularly to a method for preparing such compositions in hot melt form and to products prepared by this method.

The invention has general application to a wide field of thermoplastic coating compositions, including materials of this general classification which are intended for use directly as adhesives and also to such materials intended for use as coatings on paper or other web or sheet materials. For example, the invention has relation to thermoplastic adhesives of the type characterized by non-tackiness at or below normal room temperatures but of becoming tacky when activated by heating and then remaining tacky for an appreciable period of time after heating or cooling to a temperature at which they are normally non-tacky. Furthermore, this class of adhesive materials presents certain difficulties in preparation and use which may apply also in varying degrees to other compositions in the more general classification of thermoplastic compositions to which the invention is applicable, and the invention is therefore readily explained in connection with adhesives of the delayed tack type.

Such adhesive materials may be generally characterized as comprising as dominant constituents a thermoplastic resin and a plasticizer for the resin which is normally solid at room temperature. Such adhesive materials are highly useful for many purposes such as labeling, sealing and the like, since it is possible to activate these adhesives to a tacky condition by heating an appreciable time before they are applied to the surface to be labeled or sealed, as contrasted with thermoplastic adhesives which set effectively instantaneously upon cooling and which must therefore be activated at a location which is as close as possible to their point of application.

The property of prolonged or delayed tackiness which makes such materials especially useful, however, complicates the initial coating of the adhesive film on a label or other web of sheet material. Thus if the adhesive is applied from a dispersion in a liquid dispersion medium, the latter must be eliminated in order to dry the film. A prolonged drying or heating operation may therefore be required, and if the latter, then care must necessarily be taken to avoid heating the film to such a degree to render it tacky. In addition, such a dispersion requires preliminary fine grinding of its solid components, which further adds to its cost. If, on the other hand, the adhesive is applied from solution or in molten condition, then the same properties of prolonged tackiness which are present when it is used as an adhesive are also present in its initial application, and normally the same setting time would be required.

My copending application Serial No. 101,060, filed June 24, 1949, and assigned to the same assignee as this application, now Patent No. 2,678,284, discloses a process for quickly setting to non-tacky consistency an adhesive film possessing these properties of prolonged tackiness. More particularly, that application describes a process in which a thermoplastic adhesive of this character is formed into a fused film on a web, cooled to a temperature below the normal softening point of its solid plasticizer constituent, and then set substantially instantaneously to non-tacky condition by applying thereto a relatively small amount of the same plasticizer already present therein, with this added plasticizer being applied in finely divided form. Another process for effecting setting of such a fused film is disclosed in my application Serial No. 349,819, filed April 20, 1953, and assigned to the same assignee as this application, and it includes the steps of interleaving with or laminating to the coated web a separate web of such character that the adhesive material will not adhere thereto after setting while in intimate contact therewith so that this interleaved or covering web may be removed after the film has set.

Films of this character as outlined above which are formed from a hot melt or otherwise fused in conjunction with their formation offer definite practical advantages. Thus they require considerably lower temperatures for reactivation than is required for films of the same or similar composition which have been applied under conditions preventing the plasticizer constituent from having its plasticizing effect prior to reactivation, as for example by depositing the film from a liquid dispersion in which at least one major constituent is present as a solid phase. On the other hand, films which have been fused at the time of initial application may require more careful control of the temperature of activation in order to minimize possibly unduly high fluidity such as could cause the adhesive to strike through the paper or other web on which it is coated if it should be exposed to activating temperatures as high as are required for films of the type noted just above.

In accordance with the present invention it has been discovered that this latter undesirable result can be effectively prevented, and further that adhesive compositions of definitely improved properties can be obtained, by incorporating with the hot melt material of the adhesive a modifying constituent of a rubbery type or other high polymeric resin or elastomer, which may or may not be preplasticized depending upon the desired film forming properties. More particularly, it has been established in accordance with the invention that if this modifying constituent is present in the hot melt in dissolved or otherwise thoroughly dispersed form, the resulting composition will be activated at substantially the same lower range of activating temperatures of the same composition produced from a hot melt or solution without the film forming or modifying constituent. At the same time the composition will not decrease undesirably in viscosity at increased activating temperatures, and it will also tend to remain on the surface of the coated web and not to strike into the web. In addition, the resulting adhesive films will have improved characteristics from other practical standpoints, including adhesive grab, flexibility, and also adhesion to a wider range of materials.

As stated, in order for these desirable characteristics of the final adhesive composition to be present in a maximum degree, the film forming or modifying constituent should be dissolved or otherwise dispersed as thoroughly as possible with the other constituents, as by incorporation therewith in a hot melt, and this involves certain difficulties. More particularly, the high polymeric materials with which preferred results are obtained may not be readily incorporated in a hot melt from their normal dry state as in pellet form or the like, and they may also tend to char or otherwise decompose before melting when heated dry to a temperature sufficient to incorporate them in the hot melt. At the same time, if the modifying constituent is added as a dispersion with the remainder of the composition under conditions preventing combination of the resin and plasticizer components of the composition, the resulting product is subject to the above noted characteristic of substantially higher requirements with respect to the activating temperature, in addition to the fact that the other constituents may require fine grinding which is not necessary if they are to be initially made into a hot melt.

In accordance with the present invention, these various difficulties are obviated, and the desired improved characteristics of the thermoplastic adhesive composition are obtained by preparing the composition as a hot melt to which the modifying or film forming material is added in finely divided form in a liquid dispersion medium, and by then evaporating this liquid carrier to complete the desired incorporation of the modifying material. For example, highly satisfactory results have been obtained in the practice of the invention by adding to a hot melt adhesive composition a rubbery high polymer in water dispersion or latex form and then boiling off the water of the melt before coating or otherwise using the melt. Furthermore, the invention has been successfully practiced with a wide variety of thermoplastic adhesives, including those of both the instantaneously setting and the delayed tack type, as well as both natural and artificial rubber and other high polymers and elastomers.

The method of the invention has major advantages in that it results in effectively uniform mixing of the modifying material with the balance of the composition, and also since the temperature of the mixture does not substantially exceed the boiling point of the carrier for the modifying material during evaporation of the carrier, undesirable overheating is prevented. At the same time, the melt can be heated to a higher temperature after evaporation of the carrier without appreciable damage to the modifying material if this is necessary or desirable for a short time to establish optimum coating characteristics.

The invention offers other important advantages in addition to the improved properties of its adhesive compositions as outlined above. For example, the latices which are employed in accordance with the invention as modifying materials for the hot melt adhesive compositions are in general considerably less costly than film formers of the type more commonly employed for this purpose, which provides economical advantages for the products of the invention over and above their superior properties in use. In addition, the invention provides for the use in hot melt adhesive compositions of a wide variety of such modifying compounds which cannot otherwise be practically incorporated in a hot melt, and thus the invention makes possible hot melts of correspondingly different properties.

It is a primary object of this invention to provide a method of preparing a hot melt thermoplastic coating composition comprising a thermoplastic adhesive material and a thermoplastic high polymeric resin or elastomer for modifying the adhesive material which includes the steps of first heating the adhesive material to fluid condition, then mixing with this fluid adhesive material a quantity of the modifying material in finely divided form in a liquid carrier which is not a solvent for the adhesive material, and thereafter heating the resulting mixture to a sufficient temperature to cause evaporation of the liquid carrier until the latter is substantially eliminated from the mixture to leave the modifying material thoroughly incorporated with the resulting hot melt composition.

Another object of the invention is to provide a method as outlined above which is applicable with equal effectiveness to a considerable variety of adhesive materials such as resins, plasticizers and waxes and also combinations of two or more such materials, including adhesive compositions of the instantaneously setting thermoplastic type.

An additional object is to provide a method as outlined above which is particularly useful for combining in a hot melt a rubbery or other modifying material which would tend to char or otherwise be damaged if it were attempted to be directly melted into the other components of the melt in the absence of a liquid carrier.

It is also an object of the invention to provide a thermoplastic coating composition for coating from a hot melt on a paper or other web or sheet material which includes a thermoplastic adhesive material and also a modifying material in the form of a high polymeric resin or elastomer which is thoroughly dissolved in or otherwise incorporated with the adhesive material in such manner as to impart to the composition as a whole a relatively uniform viscosity over a substantial temperature range above the initial softening point of the composition and thereby to prevent undue fluidity and penetration of the composition into the web on which it is coated.

Additional objects and advantages of the invention will be apparent from the following detailed description of several examples of the invention and the appended claims.

Since the invention is applicable to a substantial range of materials and compositions, a number of examples will be given, in which the proportions of the component materials are given in terms of dry weight.

*Example 1*

| | Parts |
|---|---|
| Diphenyl phthalate | 67 |
| Cumar resin R–3 | 15 |
| Dow latex No. 580 | 7.5 |
| Dow latex No. 737 | 7.5 |

Cumar resin R–3 is a paracumarone-indene resin sold by Barrett and Neville, and Dow Latex Nos. 580 and 737 are water dispersions of polystyrene and of a copolymer of butadiene with styrene respectively.

In carrying out the method of the invention with the formulation of Example I, the diphenyl phthalate may first be melted by heating to a temperature sufficiently above its melting point of about 160° F. but preferably not higher than 210° F., and the latices are then stirred into the melted diphenyl phthalate. Next the temperature of the melt is raised sufficiently to evaporate the water which is the dispersion medium in the latices, and this may be done expeditiously by heating until the water boils off. If this evaporating step is carried out at atmospheric pressure, the temperature will not rise appreciably above 212° F. until the water is substantially evaporated, and at this temperature range, the solid components of the latices will not normally be damaged. Finally, the temperature is raised to about 260° F. at which point the cumar resin is added and stirred into the melt until dissolved.

The resulting composition will be a substantially clear solution showing effectively complete incorporation of the solid components of the latices, and it can then be directly coated on paper or other web material as desired, preferably after additional heating to about 280°–290° F. to give the proper consistency for easy coating, or the melt may if desired be caused to set in bulk for subsequent reheating and coating. In either case, setting of the composition may be effected in accordance with the disclosure of my above application Serial No. 101,060 by cooling the composition to a temperature below the softening point of diphenyl phthalate and then adding thereto a small amount of diphenyl phthalate in powdered form. If the composition is used for coating, setting may also be effected in accordance with my above noted application Serial No. 349,819.

Adhesive films or coatings produced as outlined above have several outstanding desirable characteristics. Thus while the set film can be activated at temperatures as low as about 200° F., the film is not undesirably affected by activation at temperatures as high as 375° F. Over this entire range of activating temperatures, the activated film will not undesirably change its viscosity, and in any case it will remain on the surface of the coated web without tending to penetrate into or strike through the web.

At the same time, such films will exhibit strong adhesion or adhesive grab over the indicated wide activating temperature range, and also the set film will be of improved flexibility.

It is not essential to follow the precise order of steps as outlined above for the formulation of Example I provided the important condition of adding the latices to at least a portion of the melted adhesive material is fulfilled. For example, the results are satisfactory if the order of steps is revised to provide for first melting the diphenyl phthalate and the cumar resin together at a temperature range of the order of 250°–300° F. The resulting solution is then preferably reduced to a temperature of the order of 180°–225° F. before adding one or more latices, which are stirred in to give a relatively heavy but smooth dispersion. Thereafter the temperature is raised until the water is boiled off and the melt is sufficiently fluid for coating.

The formulation of Example I includes materials which appear essentially compatible, as evidenced by the final clear solution, but the invention is not limited to such compatible materials. For example, similarly satisfactory results have been obtained by applying the above method to the following formulation.

*Example II*

| | Parts |
|---|---|
| Diphenyl phthalate | 67 |
| Cumar resin R-3 | 15 |
| Dow latex No. 580 | 7.5 |
| Dow latex No. 513 | 7.5 |

It will be noted that in Example II, Dow latex 513 is substituted in place of Dow latex No. 737, Dow latex No. 513 being another water dispersion of a copolymer of butadiene with styrene but in which the styrene proportion is somewhat less than in Dow latex 737, and the cloudiness of the final melt indicates incomplete compatibility of all components. The application of the invention to such incompatible materials is especially valuable, since the particle sizes in the commercially available latices are of such small order that thorough dispersion of the modifying material results even when it is not compatible with the remainder of the melt.

Among other examples of formulations giving thermoplastic adhesive compositions of the delayed tack type with which the invention has been successfully practiced as outlined above are the following:

*Example III*

| | Parts |
|---|---|
| Diphenyl phthalate | 67 |
| Cumar resin R-3 | 15 |
| Dow latex No. 580 | 7.5 |
| Natural rubber latex | 15 |

The hot melt composition produced with this formulation is relatively thick as well as thixotropic, and it is also cloudy similarly to Example II since the natural rubber is not soluble in the remainder of the melt.

*Example IV*

| | Parts |
|---|---|
| Diphenyl phthalate | 67 |
| Cumar resin R-3 | 15 |
| Kralastic 4103 | 15 |

Kralastic 4103 is a product of Naugatuck Chemical Company and is understood to be a nitryl-styrene acrylonitrile copolymer of low flexibility.

*Example V*

| | Parts |
|---|---|
| Diphenyl phthalate | 67 |
| Cumar resin R-3 | 15 |
| Kralastic 4110 | 15 |

Kralastic 4110 is a product of Naugatuck Chemical Company and is understood to be a nitryl-styrene acrylonitrile copolymer of high flexibility.

*Example VI*

| | Parts |
|---|---|
| Diphenyl phthalate | 67 |
| Cumar resin R-3 | 15 |
| FRN latex | 15 |

FRN is a product of Rohm & Haas and is understood to be an acrylic type resin emulsion.

*Example VII*

| | Parts |
|---|---|
| Diphenyl phthalate | 67 |
| Cumar Resin R-3 | 15 |
| Geon 351 | 15 |

Geon is a product of the B. F. Goodrich Chemical Co. and is understood to be a vinyl resin copolymer in water dispersion.

*Example VIII*

| | Parts |
|---|---|
| Cumar resin R-3 | 15 |
| Dow latex No. 580 | 7.5 |
| Dow latex No. 737 | 7.5 |
| Santicizer 1-H | 67 |

*Example IX*

| | Parts |
|---|---|
| Cumar resin R-3 | 15 |
| Dow latex No. 580 | 7.5 |
| Dow latex No. 737 | 7.5 |
| Dow plasticizer 77 | 67 |

Santicizer 1-H is a product of Monsanto Chemical Company and is understood to be N-cyclohexyl para-toluene sulfonamide, and Dow plasticizer 77 is understood to be tri (p-tert-butylphenyl) phosphate. Examples VIII and IX may be quickly set to non-tacky condition in accordance with my above noted application Serial No. 101,060 by applying thereto a small quantity of Santicizer 1-H or Dow plasticizer 77 respectively, in powdered form.

As noted, all of the above examples comprise adhesive compositions which possess substantial characteristics of prolonged tackiness after cooling below their softening range. The invention has also been practiced successfully with thermoplastic adhesive compositions which may be considered as semi-delayed tack in nature, in that while they do not set instantaneously at temperatures below their softening range, their period of tackiness is of relatively limited duration, for example of the order of a few minutes. Among examples of formulations of this character which have been prepared in accordance with the invention are the following:

*Example X*

| | Parts |
|---|---|
| Dow plasticizer 77 | 42 |
| Cumar resin R-3 | 7.5 |
| Pentalyn G | 36 |
| Dow latex 580 | 7.5 |
| Dow latex 737 | 7.5 |

*Example XI*

| | Parts |
|---|---|
| Santicizer 1-H | 42 |
| Cumar resin R-3 | 7.5 |
| Pentalyn G | 36 |
| Dow latex 580 | 7.5 |
| Dow latex 737 | 7.5 |

Pentalyn G is pentaerythritol ester of rosin and is a product of Hercules Powder Company.

The invention has also been successfully practiced with thermoplastic compositions of the instantaneously setting type, such for example as compositions in which the base material is primarily a wax, as follows:

Example XII

| | Parts |
|---|---|
| Paraffin wax | 300 |
| Natural rubber latex | 36 |

In this formulation, the wax was of a type having a melting point of approximately 135° F., and in preparing the composition, the wax was first melted and heated to a temperature of the order of 160° F. before adding the rubber latex. Heating of the mixture was continued until the water content of the latex had been eliminated to leave the rubber thoroughly dispersed in the wax.

A film produced from this formulation is especially useful as a coating for purposes such as bread wrappers, containers for frozen foods, and the like. It has definitely improved characteristics of adhesion, cohesion, flexibility and also moisture and vapor proofness over the wax without the rubber, while this method of preparation offers great advantages of simplicity and economy over mechanically mixing the rubber and wax. It should also be noted that the rubber content in this example is subject to considerable variation in accordance with the degree of improved characteristics desired for the composition, and if the melt is subjected to prolonged heating after evaporation of the water, the viscosity will decrease, apparently as a result of degradation of the rubber, and thereafter additional latex can be similarly incorporated if further increase in the rubber content is desired.

The invention is especially applicable to wax compositions fortified by resinous constituents, and one example of such a composition produced in accordance with the present invention is as follows:

Example XIII

| | Parts |
|---|---|
| Paraffin wax | 300 |
| Natural rubber latex | 36 |
| Staybellite ester No. 10 | 37 to 80 |

Staybellite Ester No. 10 is a product of Hercules Powder Company and is understood to be a glycerol ester of hydrogenated rosin. This formulation provides a film of increased hardness over the unfortified composition, and it also has improved qualities from the standpoint of heat-sealing adhesion.

In all of the above examples, the modifying high polymeric resin or elastomer is indicated as added in water dispersion, and this is a practical procedure especially from the standpoint of cost since it does not involve the expense resulting from loss or the necessity for recovery of an organic solvent. In any case, it will be apparent from the foregoing discussion and examples that the adhesive material into which the modifying material is mixed should have a melting point lower than the boiling point of the carrier for the modifying material in order to be sufficiently fluid for mixing at a temperature below the boiling point of the carrier. At the same time, the boiling point of the carrier should be substantially below the decomposition temperature of all non-volatile materials in the composition.

It will accordingly be seen that the invention provides an economical as well as highly effective method of incorporating rubber or other polymeric materials in hot melt compositions, and especially a method which is applicable to materials of such melting points as normally to char or otherwise decompose if subjected to prolonged heating in a dry state at a temperature sufficiently above the melting point of the base material of the composition for melting into the resulting molten base material. In addition therefore to the valuable results deriving from the properties of the compositions produced by the method of the invention, this method has major practical advantages of economy of both labor and equipment required for its practice, and it has the further outstandingly valuable characteristic of making practically possible the use in hot melt compositions of a whole class of materials which greatly improve the properties of the final composition and which are not otherwise normally usable therein. The invention thus not only provides products which possess outstanding advantages over the products for similar purposes which have previously been available, but also it provides for the production of these products by a method of outstanding simplicity and practical economy.

While the processes and products herein described constitute preferred embodiments of the invention, it is to be understood that the invention is not limited to these precise processes and products, and that changes may be made therein without departing from the scope of the invention which is defined in the appended claims.

What is claimed is:

1. In a method of producing a thermoplastic adhesive characterized by nontackiness at room temperature and by the property of becoming tacky upon heating thereof to a predetermined temperature higher than room temperature and remaining tacky for a substantial time interval following subsequent cooling to substantially room temperature and which comprises as the essential constituents thereof a major proportion of a thermoplastic resin and a specific thermoplastic plasticizer both having softening points higher than room temperature and at least one of said softening points being lower than the boiling point of water, the steps of forming a hot melt comprising at least said one of said essential constituents of said composition having said softening point lower than the boiling point of water, adding to said melt an aqueous dispersion of a rubbery material not readily soluble or otherwise incorporable from a dry state in said melt, heating said melt to a temperature sufficient to boil away the aqueous carrier from said dispersion while mixing said melt to effect thorough dispersion therein of said rubbery material irrespective of the degree of compatibility of said rubbery material in said melt, adding to said melt any of said essential constituents thereof not already present therein while maintaining the temperature of the melt above the softening points of all constituents thereof, thereafter cooling said melt to a temperature below said softening point of said plasticizer, and effecting rapid setting of said melt to solid and nontacky consistency by mixing therewith a small quantity of the same said specific plasticizer in finely divided solid form.

2. In a method of producing a thermoplastic adhesive film characterized by nontackiness at room temperature and by the property of becoming tacky upon heating thereof to a predetermined temperature higher than room temperature and remaining tacky for a substantial time interval following subsequent cooling to substantially room temperature and which comprises as the essential constituents thereof a major proportion of a thermoplastic resin and a specific thermoplastic plasticizer both having softening points higher than room temperature and at least one of said softening points being lower than the boiling point of water, the steps of forming a hot melt comprising at least said one of said essential constituents of said composition having said softening point lower than the boiling point of water, adding to said melt an aqueous dispersion of a rubbery material not readily soluble or otherwise incorporable from a dry state in said melt, heating said melt to a temperature sufficient to boil away the aqueous carrier from said dispersion while mixing said melt to effect thorough dispersion therein of said rubbery material irrespective of the degree of compatibility of said rubbery material in said melt, adding to said melt any of said essential constituents thereof not already present therein while maintaining the temperature of the melt above the softening points of all constituents thereof, applying said melt as a film on a supporting surface, cooling said film to a temperature below said softening point of said plasticizer, and then setting the resulting cooled but still tacky film to nontacky consistency by applying thereto a small quantity of the same said specific plasticizer in finely divided solid form.

3. An adhesive coated material comprising a base web having thereon a thermoplastic adhesive film prepared by the method defined in claim 2 and characterized by nontackiness at room temperature and by the property of becoming tacky without tendency to strike into said base web upon heating thereof over a substantial temperature range above the softening point thereof and of remaining tacky for a substantial time interval following subsequent cooling below the softening point thereof.

4. An adhesive coated material comprising a base web having thereon a thermoplastic adhesive film prepared by the method defined in claim 2, comprising as the essential constituents thereof a major proportion of a thermoplastic resin and a specific thermoplastic plasticizer both having softening points higher than room temperature, said film also including a rubbery material not readily soluble or otherwise incorporable in said essential constituents from a dry state, and said film being characterized by nontackiness at room temperature and by the property of becoming tacky upon heating to the softening points of said essential constituents thereof, of remaining tacky without tendency to strike into said base web upon heating thereof over a substantial temperature range above said softening points, and of remaining tacky for a substantial time interval following subsequent cooling below said softening points.

5. In a method of producing a thermoplastic adhesive characterized by nontackiness at room temperature and by the property of becoming tacky upon heating thereof to a predetermined temperature and remaining tacky for a substantial time interval following subsequent cooling to substantially room temperature and which comprises as the essential constituents thereof a major proportion of a thermoplastic resin and a specific thermoplastic plasticizer both having softening points higher than room temperature and at least one of said softening points being lower than the boiling point of water, the steps of forming a hot melt comprising at least said one of said essential constituents of said composition having said softening point lower than the boiling point of water, adding an aqueous dispersion of a rubbery material not readily soluble or otherwise incorporable from a dry state in said melt, heating said melt to a temperature sufficient to boil away the aqueous carrier from said dispersion, and adding to said melt any of said essential constituents thereof not already present therein while maintaining the temperature of the melt above the softening points of all constituents thereof.

References Cited in the file of this patent
UNITED STATES PATENTS

| | | |
|---|---|---|
| 2,462,029 | Perry | Feb. 15, 1949 |
| 2,550,834 | MacDonald et al. | May 1, 1951 |
| 2,613,156 | McGaffin et al. | Oct. 7, 1952 |
| 2,613,191 | McGaffin et al. | Oct. 7, 1952 |